July 15, 1930.    B. F. HUTCHES, JR    1,770,753
ELECTROMOTOR
Filed May 11, 1923    4 Sheets-Sheet 1

INVENTOR.
Benjamin F. Hutches Jr.
BY
Bohleber & Ledbetter
ATTORNEYS.

July 15, 1930.  B. F. HUTCHES, JR  1,770,753
ELECTROMOTOR
Filed May 11, 1923  4 Sheets-Sheet 2
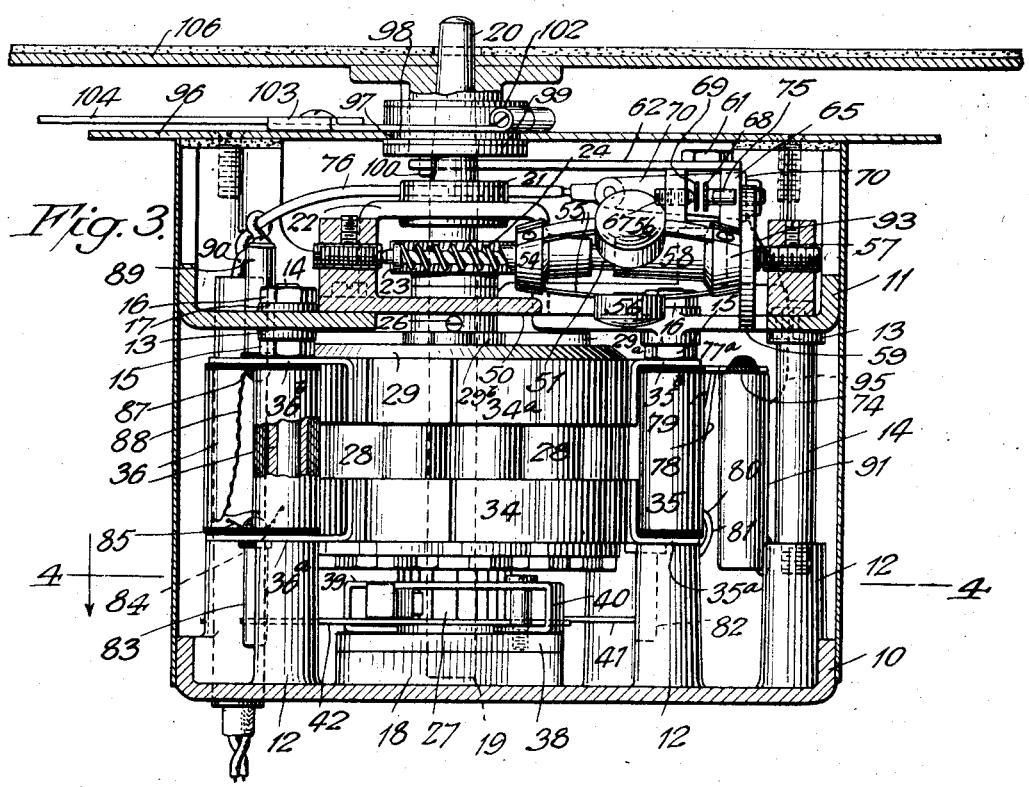
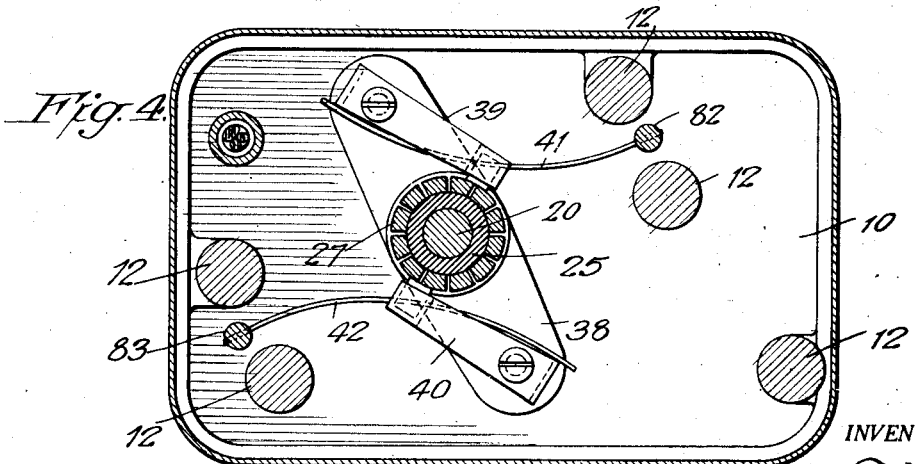
INVENTOR.
Benjamin F. Hutches Jr.
BY
Bohleber & Ledbetter
ATTORNEY.

July 15, 1930.  B. F. HUTCHES, JR  1,770,753
ELECTROMOTOR
Filed May 11, 1923   4 Sheets-Sheet 3
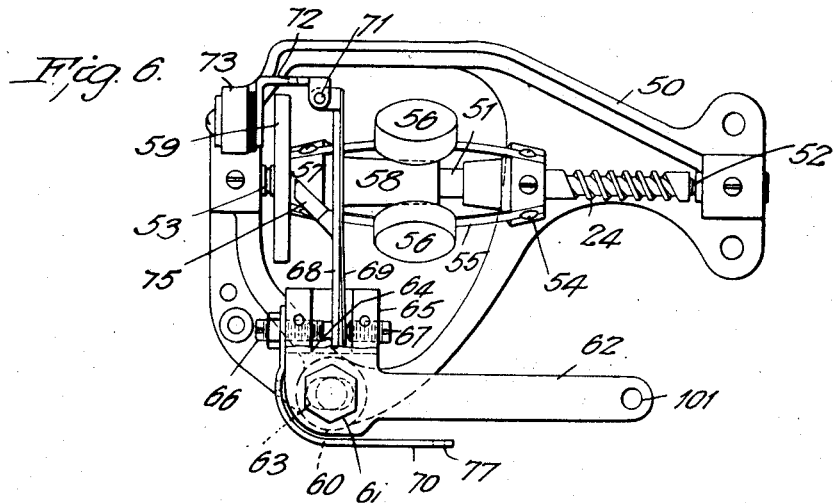
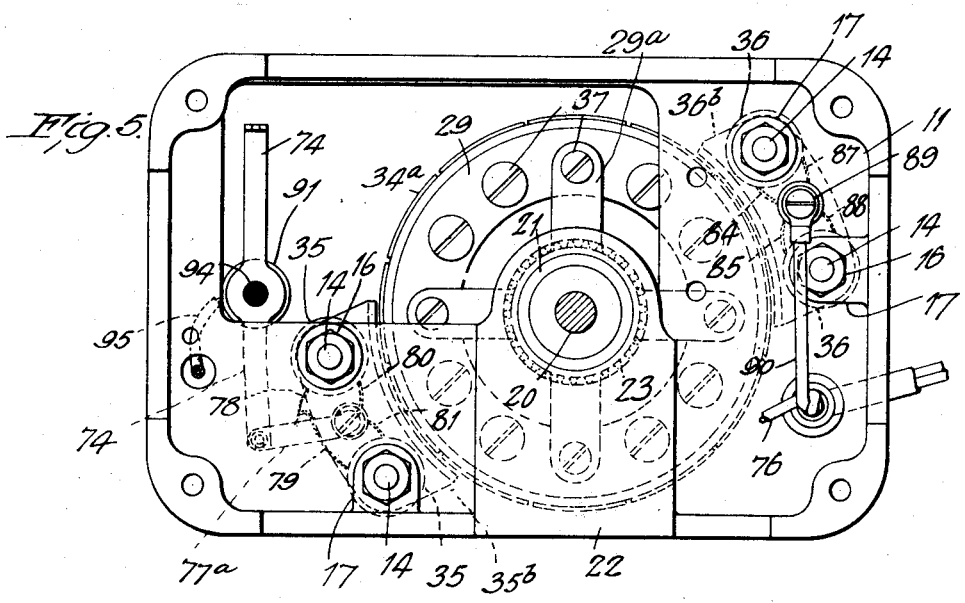
INVENTOR.
Benjamin F. Hutches Jr.
BY
ATTORNEYS.

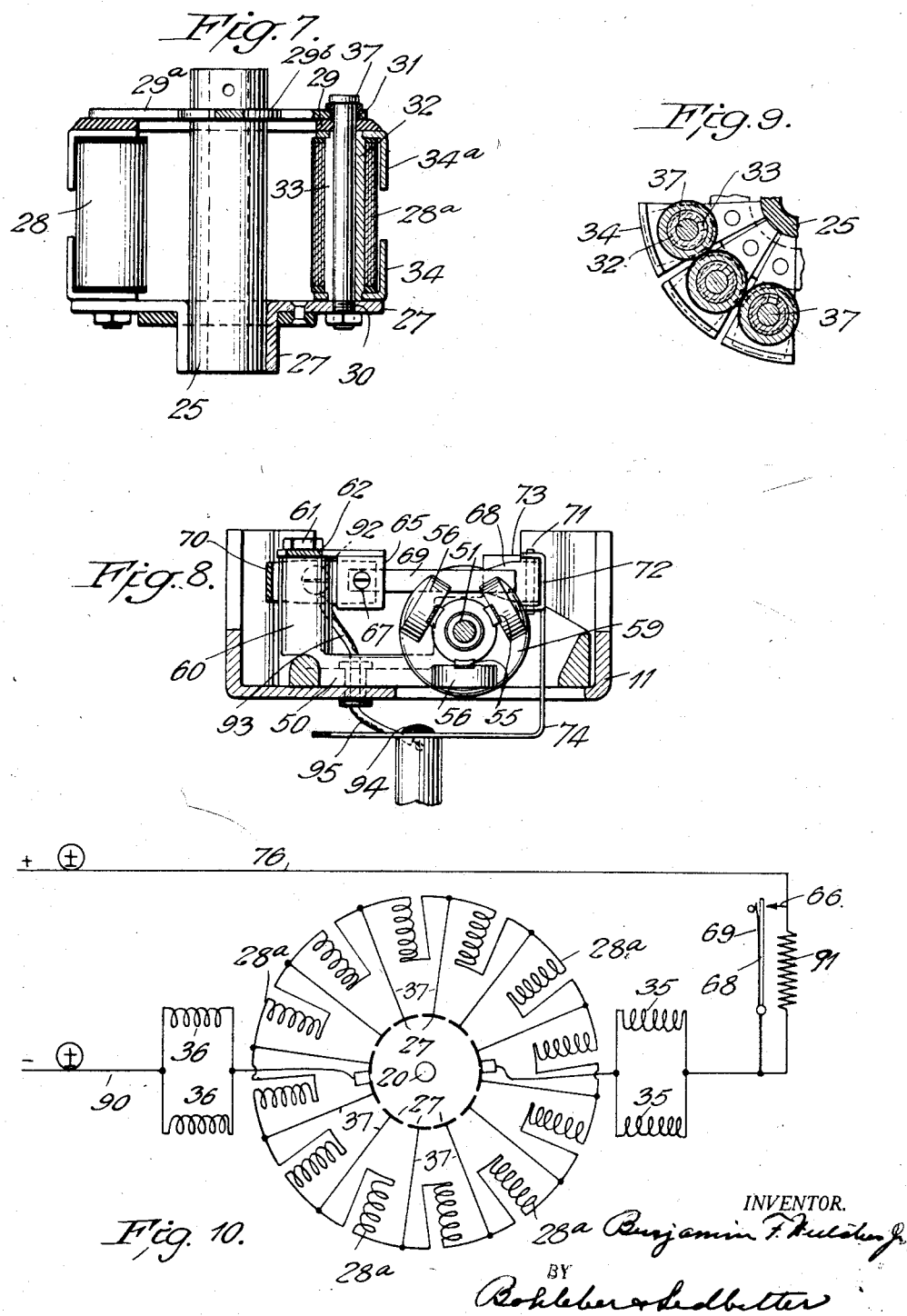

Patented July 15, 1930

1,770,753

UNITED STATES PATENT OFFICE

BENJAMIN F. HUTCHES, JR., OF ALLENDALE, NEW JERSEY

ELECTROMOTOR

Application filed May 11, 1923. Serial No. 638,163.

This invention relates to propulsion mechanism. More specifically it relates to propulsion mechanism of the type in which electromotive-force is applied to a motor and thereby translated into mechanical power.

One of the objects of the invention is to provide a novel form of electric motor. Other objects are: to provide an electric motor operable by either unidirectional or alternating current; to provide a motor that is simple in construction, and easy to manufacture and repair, though efficient in operation; to provide novel motor-speed controlling means; and to provide a constant speed propulsion means in the form of a unit in which access may be had to the component parts with facility. Other objects and advantages will appear as the invention is hereinafter disclosed. While the invention may be applied to other uses, I have shown it applied as the propulsion mechanism of a phonograph or sound-reproducing machine, since it is admirably adapted to be so employed.

It may be stated, generally, that the armature or rotor coils are arranged with their axes parallel to the shaft of the rotor and also circumferentially with respect to said shaft. This enables me to equip the armature coils with arcuate pole pieces at the opposite ends of each armature coil, and also circumferentially arranged end to end with one another around the motor shaft as an axis to form a plurality of sets of axially spaced pole pieces. In other words, the pole pieces are circularly arranged around the periphery of the rotor. Arranged parallel, or otherwise suitably arranged with respect to the armature coils, are field or stator coils provided with pole pieces at the opposite ends thereof and cooperating with the pole pieces of the armature or rotor. The pole pieces of the field or stator are substantially the same axial length as the pole pieces of the armature or rotor but of a width or length in a circumferential direction substantially equal to the circumferential length of two poles of the armature coils. In other words, each pole piece of the field overlaps at least two poles of the armature coil. The construction is such that each magnetic field (there are two in the present case) is a single unit and that both fields are similar, that is, interchangeable. The arrangement is also such that the pole pieces on the armature do away with the dead spaces between successive coils. The magnetic circuits are in planes substantially longitudinal and the torque is in planes substantially perpendicular to the axis of rotation of the rotor. All armature windings are similar and there is comparatively little loss in the motor due to hysteresis and eddy currents.

The motor frame consists of upper and lower members or plates rigidly but detachably united to each other by means of suitable bolts, preferably so arranged that the field coils are located thereon. Therefore, in addition to acting as a binder for the upper and lower members, these bolts serve as spacers for spacing the magnetic field in proper relation to the rotor.

Another of the more important features of this invention consists in the provision of an improved form of regulator for controlling the speed of the motor, and for maintaining that speed after the regulator has been set and for varying this speed at will. The speed regulator is adapted to control various types of motors. In the embodiment of the invention illustrated however, improved mechanism for regulating the speed of an electromotor for the operation and actuation of talking machine turn-table, is shown. The object of the improved regulator is to control the speed of an electromotor, regardless of variations in impressed voltage or the increase or the decrease of load, and to prevent undue acceleration of the motor sufficient to unfavorably influence the operation of the mechanism or the machine which the electromotor is driving. It is to be particularly noted that the speed regulator is equipped with an interrupter cooperating with brake mechanism so constructed and arranged that as soon as the current is interrupted in the main circuit due to increase of speed in the motor, a braking action will take place and continue as long as the input on the motor is sufficient to maintain an open circuit at the contact breaker.

Another of the more important features of my invention consists in the provision of a unitary auxiliary frame work adapted to be connected to the main frame of the motor which auxiliary frame carries the entire regulating means with a result that the latter may be readily removed from the motor proper to be repaired or replaced by the mere removal of two or three screws.

As stated above, other objects, advantages and features of construction will more fully appear from the detailed description below taken in connection with the accompanying drawings, in which:

Fig. 3 is a vertical section taken on the line 3—3 of Fig. 2;

Fig. 4 is a horizontal section taken on the line 4—4 of Fig. 3;

Fig. 5 is a top plan view of the motor with the speed regulator removed.

Fig. 6 illustrates the unitary construction or arrangement of the speed regulator before it is asembled on the motor.

Fig. 7 is a vertical section of the rotor employed in connection with the motor;

Fig. 8 is a vertical section taken on the line 8—8 of Fig. 2;

Fig. 9 illustrates a detailed view of a plurality of armature coils; and

Fig. 10 is a wiring diagram of the motor.

Figure 1:
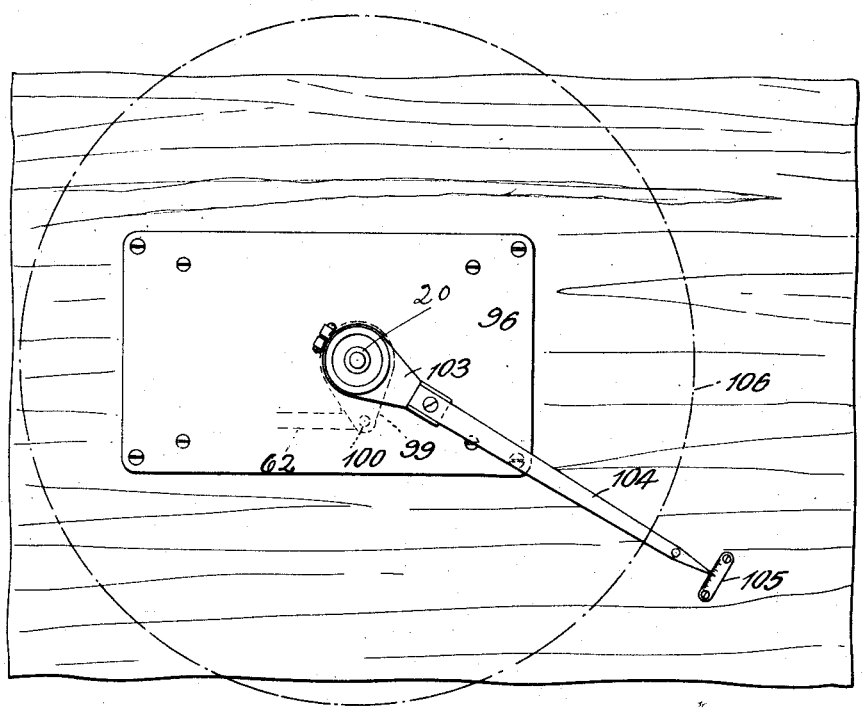
Fig. 1 is a top plan view of the motor, illustrating the speed regulating arm.
Figure 2:
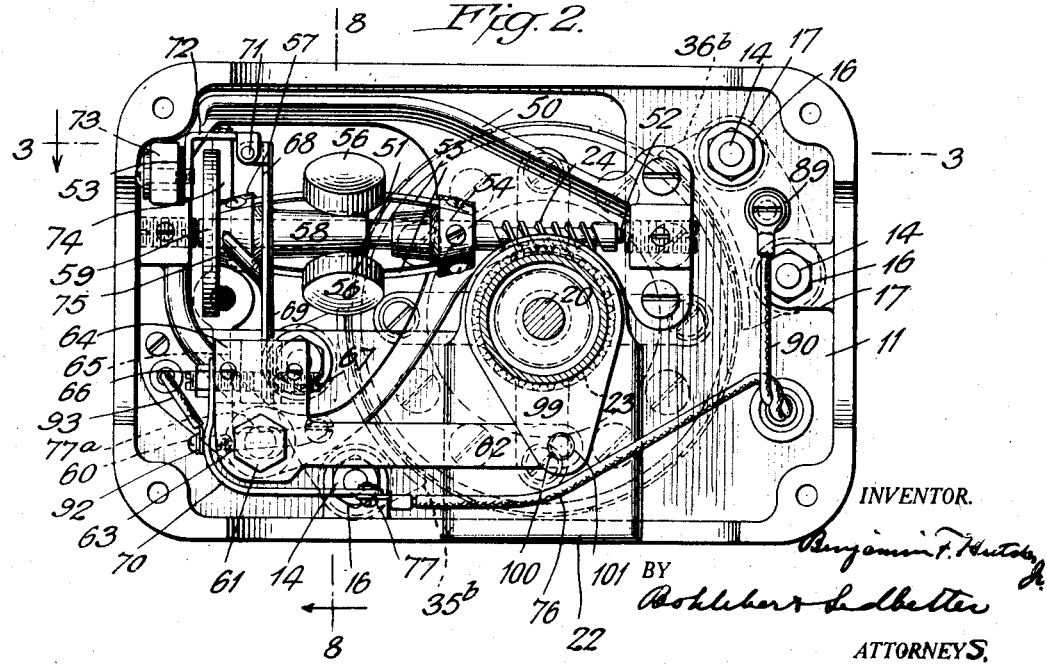
Fig. 2 is a top plan view, partly in section, with the cover plate removed.

Referring to the drawings in detail, the reference numeral 10 (see Fig. 3) designates a base member or plate and the reference numeral 11 a corresponding top member or plate. The base member 10 is provided with a plurality of upwardly projecting internally screw-threaded standards 12 in alignment with the perforated bosses 13 projecting downwardly from the top member 11. The members 10 and 11 are rigidly secured to each other by any suitable means, but I preferably employ the bolts 14, the lower ends of which are screw-threaded to engage with the upwardly projecting standards 12, and the upper ends of each of which are threaded to receive the nuts 15 and 16, the former of which abuts against the lower sides of the downwardly projecting bosses 13, and the latter of which engage with correspondingly aligned bosses 17 projecting upwardly from the top member 11. It will therefore be seen that when a screw threaded engagement is effected between the upwardly projecting standards 12 and the bolts 14 the stator coils 35 and 36 are assembled thereon and the nuts 15 adjusted to hold said coils in fixed relation to the other parts of the machine. Thereafter the member 11 is assembled in position to rest upon the nuts 15 after which the nuts 16 are properly adjusted to secure the member 11 to said bolts.

The base member or plate 10 is provided with a journal and thrust bearing 18 to receive the lower end 19 of the rotor shaft 20 and the upper member or plate 11 is provided with a bearing 21 to receive the upper end of the shaft 20. The bearing 21 is carried in an elevated portion 22 of the top member 11. Fixed upon the motor shaft 20, preferably below the elevated portion 22, is a noiseless worm gear 23 which meshes with a worm 24 located upon the shaft 51 of a speed-responsive device or centrifugal governor which will be described in detail below.

Located upon the vertically arranged shaft 20 is a rotor comprising a tubular member 25 of insulating material (see Figs. 4 and 7) fixed to the shaft 20 preferably by means of a plurality of set screws 26. This tubular member 25 carries a plurality of commutator segments 27 and mounted in turn upon the radially projecting or flange-forming portions of these segments are a plurality of helical armature coils or windings 28 held parallel to each other by means of a fibre disk 29. The radially projecting portions of the commutator segments 27 are provided with perforations 30 in alignment with corresponding perforations 31 in the fibre disk 29. The armature coils 28 are mounted upon suitable cores 32 of magnetic material the inner sides of which are slotted from end to end and in the direction of the magnetic flux, as indicated at 33. The field or stator windings are indicated at 35 and 36. Each core 32 is provided with pole pieces 34 and 34ᵃ of magnetic material at the upper and lower ends thereof to cooperate with correspondingly shaped pole pieces 35ᵃ and 35ᵇ and 36ᵃ and 36ᵇ of magnetic material projecting radially inward from the field magnets 35 and 36. Passing through the perforations 30 and 31 previously described, and through the cores 32 of the armature coils 28 are bolts 37 for securing the cores 32, commutator segments 27, disk 29 and poles 34 and 34ᵃ rigidly with one another to constitute the rotor. The fibre disk 29 is held against lateral movement preferably by means of a spider comprising arms 29ᵃ secured to said disk and an annular ring 29ᵇ fitting snugly around the outer periphery of the tubular member 25.

Suitably secured to the lower bearing member 18 is a brush holder yoke or member 38 of insulating material (see Fig. 4) serving as a support for the brush holders 39 and 40 pivotally or otherwise movably mounted thereon. These brush holders are held normally in engagement with the commutator segments 27 by means of the resilient members or biasing springs 41 and 42 respectively. These resilient members 41 and 42, as will more fully hereinafter appear, serve also as electric conductors for the current employed in driving the motor.

For simplicity of construction, the field magnets 35 and 36 are preferably arranged upon the bolts 14 employed for rigidly connecting the members 10 and 11 to each other. If desired, however, they may be located independent of said bolts 14. The field magnets 35 and 36 are located 180 electrical degrees apart, in the present case 180 actual degrees, i. e. on opposite sides of the rotor for reasons which will be clearly understood.

Located upon the top member or plate 11 is a frame 50 employed for carrying the governor mechanism. The governor shaft 51 is supported at one end by an adjustable cone bearing 52 and at its other end with an adjustable cone bearing 53. This enables the governor shaft to be adjusted longitudinally at will. Upon the governor shaft is fixed a suitable collar 54 to which one of the ends of each of the resilient members 55 is secured. These resilient members are adapted to carry the centrifugal masses or fly weights 56. The other ends of the resilient members 55 are secured to a correspondingly shaped member 57 equipped on one side with a sleeve or collar 58 and upon the other side of which is secured a governor disk 59. The members 57, 58 and 59 are slidably mounted upon the governor shaft 51 for controlling the speed of the motor, as will presently appear.

Projecting upwardly from the framework 50 is a post 60 equipped with an internal screw thread to receive the screw threads of the bolt 61. Slidably mounted upon the post 60 and held thereon by the bolt 61 is an arm 62 having a longitudinal slot 63 through which the bolt 61 passes and also having an angular extension 64. An insulated U-shaped block 65 is located below and supported by the angular extension of the arm 62. The block 65 carries an adjustable contact 66 and an adjustable stop 67 against the former of which the current interrupting member 68 normally contacts and against the latter of which the spring member 69 constantly engages. Fixed to the block 65 is a rigid conducting member or strip 70 for electrical connection with the contact 66. The arm 62 is slotted, as indicated at 63, not only to receive the bolt 61 but to enable a substantial longitudinal movement of said arm for controlling the speed of the motor. The spring member 69 is suitably connected to the movable contact member 68, and has for its function to bias the conducting member 68 into engagement with the contact 66. The conducting member 68 is pivotally connected at 71 to the arms of a suitable bracket 72. This bracket 72 is in turn mounted upon a post 73 projecting upwardly from the framework 50. The bracket 72, however, is insulated from said post 73. From the contact 66 the current flows to the conducting arm 68 and suitably connected to the bracket 72 is a member 74 for conducting the current from the arm 68 to the field coils 36 which will be more fully explained below. The conducting arm 68 is equipped with a laterally projecting stud or brake shoe 75 adapted to be engaged by the governor disk when the motor attains a certain predetermined speed, the result of which is that the rotor is braked and the contact 66 is momentarily broken thus preventing any further increase in the speed of the motor. As a matter of fact, in normal operation, there occurs a more or less rapid succession of interruptions between the contacts 66 and 68 of the circuit controller, thus enabling the motor to run at a constant speed. In the absence of such provisions, any variations in the load put upon the motor would result in corresponding variations in the speed thereof. It will also be apparent that upon the longitudinal adjustment of the arm 62 and in consequence, a corresponding adjustment of the position of the contact 66 with respect to the governor, the speed of the motor may be increased or decreased at will, and that after said adjustment has been made the motor will run at a constant speed.

The current enters the motor through the main conducting wire 76, which is attached at 77 to the rigid conducting strip 70. The current then flows as previously described, through the contact 66, current interrupter 68, bracket 72, and arm 74 to the arm 77$^a$ mounted upon but insulated from the pole shoe 35$^b$ of the field coils 35. From this arm 77$^a$ the current is conducted by the wires 78 and 79 to the coils of the field magnets 35. The current leaves the coils 35 by the wires 80 and 81 leading to a member 82 attached to the lower pole shoe 35$^a$ of the said field coils. From the member 82 the current is conducted by means of the spring wire 41 to the brush holder 39 of the motor. From the brush holder 39 the current of course passes through the armature coils leaving the latter by way of the brush holder 40 and spring wire 42 where it connects to a conducting member 83 leading to the pole shoe 36$^a$ of the field coils 36 located on opposite side of the motor from the field coils previously described. The current flows from the member 83 to the wires 84 and 85, the same being the leading wires to the field magnets 36. The current leaves the said field magnets by the wires 87 and 88 which connect with a conducting post 89 mounted upon but insulated from the upper pole shoe 36$^b$ of the field magnets 36 just described and from the post 89 the current is conducted to the main wire 90 back to the source of supply.

When the circuit is broken at the contact 66, the current passes through a resistance 91 shunted across said contact, said resistance being electrically connected at 92 to the conducting strip 70 by means of the wire 93, and electrically connected at 94 to the conducting member 74 by means of the wire 95. The arm 68 and spring 69 not only serve as an interrupter for the current whenever the motor attains a predetermined speed but by virtue of the stop 67 and projection of brake shoe 75 they act as a brake. The arrangement of the arm 68, projection 75 and governor disk 59 is such that a slight movement of the projection 75 will give an increased throw to the outer end of the arm 68 at the point where it engages with the contact 67. The braking action continues as long as the speed of the motor is sufficient to maintain the contacts 66 and 68 separated.

The upper member or plate 11 of the motor is equipped with a suitable cover plate 96 having a perforation 97 therein adapted to receive a sleeve 98 the lower end of which is provided with a laterally extending arm 99 having a pin 100 normally engaging a perforation 101 in the arm 62. The arm 99 is fixed to rotate with the sleeve 98. The upper end of the sleeve 98 is provided with a laterally projecting annular flange 102 and between the latter and the plate 96 is a second arm 103 having a frictional engagement with the sleeve 98. To the arm 103 is detachably connected a suitable operating member 104. It will therefore be apparent that when the arm 104 is actuated in either direction the arm 99 will be moved about the axis of the sleeve 98 as a center and thereby impart a substantially longitudinal movement to the arm 62 and thus control or regulate the speed of the motor, a suitable indicator 105 being employed to indicate said speed. The upper end of the shaft 20 is shown constructed to receive a phonograph turntable 106.

For the most efficient operation of the device the pole pieces of the field or stator magnets are of substantially the same length from top to bottom as the poles of the rotor but the stator pole pieces have a circumferential length substantially equal to the circumferential length of two poles of the armature coils.

In order to explain the electrical connections and operation of the motor in somewhat greater detail I shall refer to the plane passing through the axis of rotation of the rotor and through the median lines of contact of the two brushes as the plane of commutation. Referring now to Fig. 10, the inner ends of the helical coils 28$^a$, i. e. the ends of the said coils adjacent the commutator, represent the lower ends of the same coils as shown in Figs. 3 and 7. The coils or helices 28$^a$ are so connected to each other that if a source of E. M. F. were substituted for any one of the coils and the brushes raised, the upper ends of the coils and their adjacent rotor pole pieces would all be of the same magnetic polarity with respect to each other; and the lower ends of the coils and their adjacent rotor pole pieces would all be of the same polarity with respect to each other but of opposite polarity with respect to the upper rotor pole pieces. The junctions between adjacent pairs of coils are each electrically connected to a corresponding one of the segments 27 of the commutator. These rotor connections are conveniently effected by soldering, or otherwise suitably connecting, one end of each coil 28$^a$ and the opposite end of an adjacent coil to the end (opposite the commutator) of a corresponding adjacent one of the bolts 37. The latter then serve to form the electrical connections or taps between the coil junctions and commutator segments.

It will now be appreciated that if the brushes are in position on the commutator and an E. M. F. impressed across the brushes, those of the upper rotor pole pieces which lie on one side of the plane of commutation will all be of the same magnetic polarity, and those of the upper rotor pole pieces which lie on the opposite side of the said plane will be of the same polarity with respect to each other but opposite to that of the other upper rotor pole pieces. Each of the lower rotor pole pieces will be of opposite magnetic polarity with respect to its corresponding (immediately above) upper pole pieces. The coils 35 and 36 are so electrically connected that of the upper stator pole pieces is of opposite magnetic polarity with respect to the other upper stator pole piece. In other words, each upper stator pole piece is of the same magnetic polarity as the lower pole piece which is spaced 180 electrical degrees (in the present case 180 actual degrees) from it in a circumferential direction.

In operation, each rotor pole piece as it approaches a stator pole piece is of opposite magnetic polarity with respect to the latter, and each rotor pole piece as it is receding from a stator piece is of the same polarity as the latter. Thus a continuous torque is exerted between the stator and rotor which causes rotation of the latter. So long as the speed of the rotor is below a predetermined amount the contacts 66—68 are closed and the resistance 91 short-circuited. However, when the speed of the rotor exceeds the said predetermined amount the contacts 66—68 open and thereby reduce the flow of current through the motor thereby slowing it down. The resistance 91 not only serves as a means for reducing the current in the motor circuit but also serves as a discharge resistance to prevent objectionable arcing at the contacts 66—68. As stated above, the contacts 66—68 make and break in rather rapid succession so that the speed of the motor is maintained practically constant with comparatively little hunting.

Because of its importance I wish to emphasize the fact that motors built in accordance with my invention may be assembled, disassembled and repaired with great facility. By the removal of the cover plate 96 access may be had to the speed regulating instrumentalities, and the latter may be readily removed as a unit from the upper plate 11, as clearly illustrated in Figs. 5 and 6, for repair or replacement. For the sake of simplicity of construction and for convenience in assembling the motor unit the bolts 14 employed for securing the members 10 and 11 to each other, pass through the stator coils 35 and 36 as clearly illustrated in Fig. 3. At the right hand side of this figure, I have also illustrated an additional bolt to the same end but that is not necessary. The nuts 15 are employed to hold the stator coils in proper position. To remove the member or plate 11 it is only necessary to remove the nuts 16. If it is desired to obtain access to the motor it is only necessary to remove the cover plate 96 and top plate 11 without necessarily removing the speed regulating means from the plate 11. The stator elements and coils may then be readily removed and also the rotor. Any of the rotor coils or elements may be removed and replaced, without removing the other coils, by severing the electrical connection between the particular coil and its bolt 37 and then removing the bolt.

In accordance with the provisions of the patent statutes, I have herein described the principles of operation of my invention, together with the apparatus which I now consider to represent the best embodiments thereof, but I desire to have it understood that the apparatus disclosed is only illustrative and that the invention can be carried out by other means within the scope of the appended claims. The specific form of motor herein illustrated and described is series wound and this I do only because I prefer to employ such a winding in operating the turntable of a phonograph. It will be readily apparent however that for many uses or for various reasons it would be desirable to employ shunt or compound windings. Hence, I do not limit the invention to a series wound motor. Also, while it is designed to use the various features and elements in the combinations and relations described, some of these may be altered and others omitted without interfering with the more general results outlined, and the invention extends to such use within the scope of the appended claims.

What I claim is:

1. A rotor for electric motors comprising in combination, a commutator, a plurality of helical windings supported by said commutator and each having its axis spaced from and substantially parallel to the axes of the others of said windings and the axis of rotation of said rotor, and electrical connections between said commutator and windings.

2. A rotor for an electric motor comprising in combination, a commutator having a radially extending flange portion, and a plurality of circumferentially spaced solenoid cores supported by said flange portion and each having its axis substantially parallel to the axis of rotation of the rotor.

3. A rotor for an electric motor comprising in combination, an end plate, a plurality of circumferentially arranged helical windings, each having its axis substantially parallel to the axis of rotation of the rotor, magnetic core members for each of said windings, removable magnetic pole pieces at each end of the core members extending over a portion of the winding, and means for securing each of said windings independently to said end plate comprising a member passing thru said core and said end plate.

4. A rotor for an electric motor comprising in combination, an end plate, a plurality of circumferentially arranged helical windings, each having its axis substantially parallel to the axis of rotation of the rotor, magnetic core members for each of said windings, said members being in the form of longitudinally slotted cylinders, and means for securing each of said windings independently to said end plate comprising a member passing through said core and said end plate.

5. An electric motor comprising in combination, a rotor including a commutator having a radially extending flange portion, a plurality of circumferentially spaced solenoid cores supported by said flange portion and each having its axis substantially parallel to the axis of rotation of the rotor, and means comprising a stator for impressing a magnetic torque on said rotor.

6. An electric motor comprising in combination, a rotor having a plurality of sets of removable pole pieces, the pole pieces of one set being substantially equidistantly spaced from the axis of rotation of the rotor, and the pole pieces of a second set being substantially equidistantly spaced from the axis of rotation of the rotor and at substantially the same radial distance from the axis of rotation of the rotor as the corresponding radial distance of said first set, said second set being spaced from said first set in the direction of the axis of rotation of the rotor and removable magnetic core members connecting pole pieces of said sets; and stator elements for completing paths of magnetic flux from one of said sets of pole pieces to another set.

7. An electric motor comprising in combination, a rotor having a shaft, spaced plates in which opposite ends of the shaft of the rotor are journaled, a plurality of rods connecting said plates, a plurality of stator windings each surrounding a corresponding one of said rods, motor-speed-controlling devices mounted on one of said plates on the side thereof opposite the rotor, and connections between said rotor and controlling devices.

8. A rotor for an electric motor comprising a shaft, an insulating sleeve member surrounding said shaft, a commutator mounted on said sleeve and having its segments radially extended to form an end plate member, an annulus secured to the shaft and a plurality of coils mounted between said annulus and said end plate member.

9. A rotor for an electric motor comprising a shaft, an insulating sleeve member surrounding said shaft, a commutator mounted on said sleeve and having its segments radially extended to form an end plate member, an annulus secured to the shaft, and a plurality of coil members, each comprising a winding, a core of magnetic material, and a pair of pole pieces mounted between said annulus and said end plate member.

10. A rotor for an electric motor comprising a shaft, an insulating sleeve member surrounding said shaft, a commutator mounted on said sleeve and having its segments radially extended to form an end plate member, an annulus secured to the shaft, and a plurality of coil members, each comprising a winding, a core of magnetic material, and a pair of pole pieces mounted between said annulus and said end plate member, and a securing member for each coil member passing through said annulus, core and end plate member.

11. An electric motor comprising in combination, a rotor having a plurality of circumferentially arranged removable magnetic core members and positioned parallel to the axis of the rotor, pole pieces at each end of each core member, a coil upon each core member to carry an electric current, said pole pieces extending parallel to and over the coil, a stator having a plurality of angularly spaced pole members to attract the rotor magnets and rotate it, and a commutator rotatable with said rotor for controlling the polarity of said rotor pole pieces.

12. An electric motor comprising in combination, a rotor having a plurality of circumferentially arranged removable magnetic core members and positioned parallel to the axis of the rotor, pole pieces at each end of each core member, a coil upon each core member to carry an electric current, said pole pieces extending parallel to and over the coil, a stator having a plurality of angularly spaced pole members to attract the rotor magnets and rotate it, said stator pole member consisting of core members carrying a coil and having pole pieces at each end extending over the coil, and a commutator rotatable with said rotor for controlling the polarity of said rotor pole pieces.

13. An electric motor comprising in combination, a rotor having a plurality of circumferentially arranged removable magnetic core members and positioned parallel to the axis of the rotor, pole pieces at each end of each core member, a coil upon each core member to carry an electric current, said pole pieces extending parallel to and over the coil, a stator having a plurality of angularly spaced pole members to attract the rotor magnets and rotate it, and a commutator rotatable with said core members carrying a coil and having separate pole pieces at each end extending over the coil, and a commutator rotatable with said rotor for controlling the polarity of said rotor pole pieces.

14. A rotor for an electric motor comprising in combination, an end plate, a plurality of circumferentially arranged helical windings each having its axis substantially parallel to the axis of rotation of the rotor, magnetic pole pieces for each winding and at the ends thereof, said pole pieces projecting towards each other and extending over a portion of the winding, and means for securing said windings to the end plate.

In testimony whereof, I have hereunto set my hand this 16th day of April, 1923.

BENJAMIN F. HUTCHES, Jr.

CERTIFICATE OF CORRECTION.

Patent No. 1,770,753.  Granted July 15, 1930, to

BENJAMIN F. HUTCHES, JR.

It is hereby certified that error appears in the printed specification of the above numbered patent requiring correction as follows: Page 4, line 2, for the word "of" second occurrence read or, and line 92, after "that" insert each; and that the said Letters Patent should be read with these corrections therein that the same may conform to the record of the case in the Patent Office.

Signed and sealed this 21st day of October, A. D. 1930.

(Seal)

M. J. Moore,
Acting Commissioner of Patents.